UNITED STATES PATENT OFFICE.

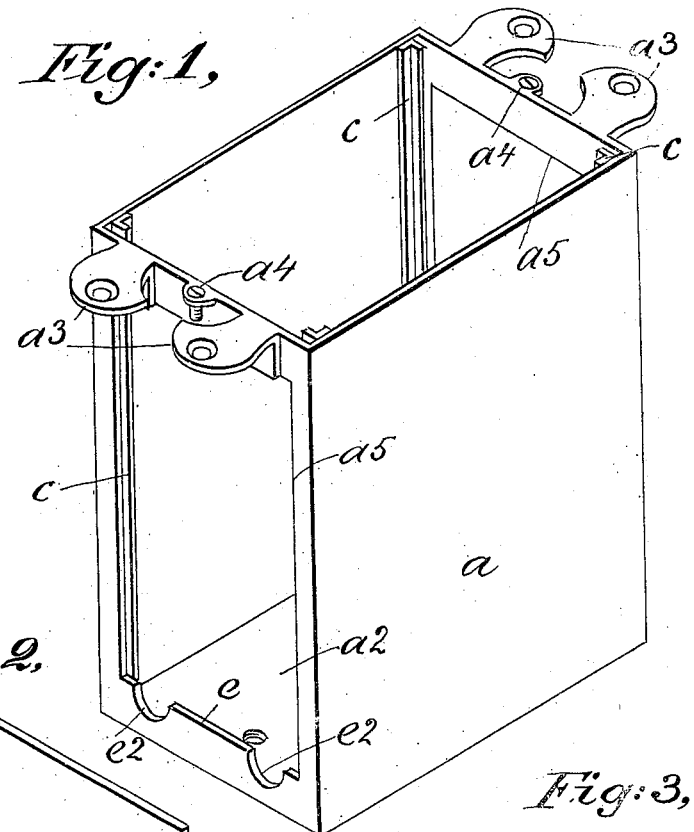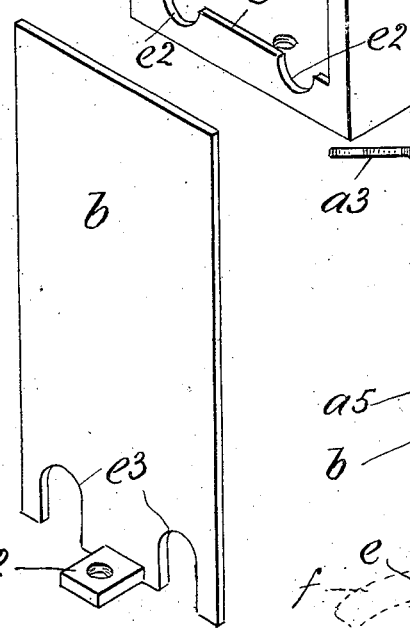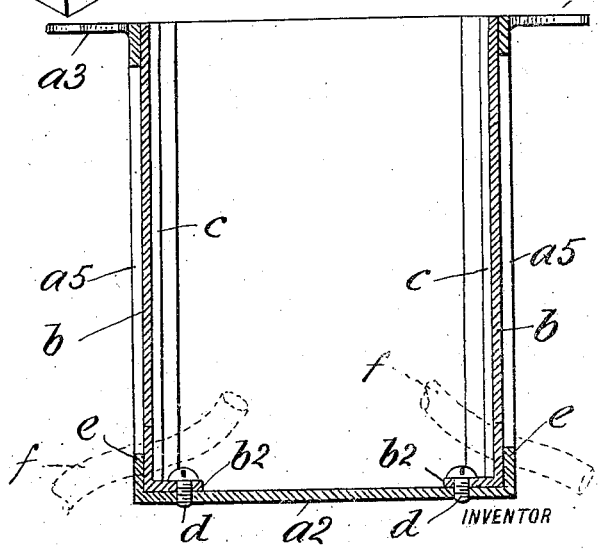

WILLIAM R. ATKINSON, OF NEW YORK, N. Y.

ELECTRIC SWITCH-BOX.

No. 855,550.   Specification of Letters Patent.   Patented June 4, 1907.

Application filed July 16, 1906. Serial No. 326,366.

*To all whom it may concern:*

Be it known that I, WILLIAM R. ATKINSON, a citizen of the United States, and residing at New York, in the county of New York and State of New York, have invented certain new and useful Improvements in Electric Switch-Boxes, of which the following is a specification, such as will enable those skilled in the art to which it appertains to make and use the same.

This invention relates to electric switch boxes for use in connection with wall switches, and the object thereof is to provide an improved device of this class designed for use in connection with flush wall switches; a further object being to provide an improved device of the class described, the construction of which is such as to facilitate the installation of electric cables for electric lights and similar purposes whereby the insertion of the cables into the switch box and the locking of said cables in said box is facilitated.

The invention is fully disclosed in the following specification, of which the accompanying drawing forms a part, in which the separate parts of my improvement are designated by suitable reference characters in each of the views, and in which:—

Figure 1 is a perspective view of my improved switch box and showing the opposite sides thereof open; Fig. 2 a similar view of one of the side plates of the box detached; and, Fig. 3 a longitudinal central section through the complete box.

In the practice of my invention, I provide a switch box $a$, which is of the usual form and composed of lead or other suitable material. The box $a$ is closed at one end as shown at $a^2$ and open at the other end and provided with projecting lugs $a^3$, whereby it may be secured to a wall construction in the usual manner. The open end of the box is also provided with the usual lugs or projections and screws $a^4$ by means of which the switch plate or cover of the box is secured thereto as usual with other devices of this class.

The opposite sides of the box $a$ are open as shown at $a^5$, and said open sides are closed, in practice, by plates $b$. The corner portions of the box $a$ are provided with longitudinally arranged angular shaped keepers $c$ between which and the open sides of the box the plates $b$ are inserted, and said plates $b$ are provided at the inner ends thereof with angular-projections $b^2$ through which are passed screws $d$ by which the plates $b$ are held in position, and said plates, when inserted into the box close the openings $a^5$ in the opposite sides of the box and form a complete box open only at the outer end which, in practice, is closed by the switch and cover plate hereinbefore referred to.

The plates $b$ are not quite as long as the box, and the box is provided at the closed end with inwardly directed flanges or side members $e$ provided with segmental recesses $e^2$. The corresponding ends of the plates $b$ are provided with similar recesses $e^3$, and when the plates $b$ are inserted into position as shown in Fig. 3, the recesses $e^2$ and $e^3$ form circular openings in the opposite sides of the box through which electric cables $f$ may be passed as indicated in dotted lines in Fig. 3.

Electric switch boxes of this class are usually provided in the opposite sides thereof with holes into which the cables are passed, but these holes are small and it is very difficult in a wall construction of the class described to get the cables into the boxes, but with my improvement, in which the opposite side portions of the boxes are made separate and removable there is comparatively no trouble whatever of this kind as the electric cables can be easily passed into open sides of the boxes, and the separately formed side members of the box may then be inserted and secured in position, and in this operation the cables are forced back into the openings formed by the recesses $e^2$ and $e^3$ as hereinbefore described, and it will be understood that any desired number of said openings may be employed, and one or more of said openings may be closed when not desired for use in the manner of other devices of this class. My improved switch box may also be used in all kinds or classes of wall construction the same as other devices of this class, or wherever the use of such devices is required, the only difference between my improved electric light switch box and others of this class being in the fact that the opposite side portions of the box are formed separate and detachably connected therewith in the manner described, the holes through which the electric cables are inserted being formed in the end part of the detachable side portions of the box, or partly in said detachable side parts of the box, and partly in the permanent side members of the box in connection with which the detachable side portions of the box are employed.

Having fully described my invention, what

I claim as new and desire to secure by Letters Patent, is:—

1. An electric switch box, the opposite side portions of which are formed separately and detachably connected therewith, said side portions of the box being provided at their inner ends with recesses or openings.

2. An electric switch box, the opposite side portions of which are formed separately and detachably connected therewith, said side portions of the box being provided at their inner ends with recesses or openings, and the corresponding end of the box being provided with stationary side members having corresponding openings or recesses.

3. An electric switch box, the opposite side portions of which are open, one end of said box being closed, and the closed end of said box being provided with inwardly directed side members having recesses formed therein, and separate plates designed to close the open opposite side portions of the box said plates being adapted to be inserted into the open end of the box and being provided at their inner ends with recesses or openings.

In testimony that I claim the foregoing as my invention I have signed my name in presence of the subscribing witnesses this 14th day of July 1906.

WILLIAM R. ATKINSON.

Witnesses:
F. A. STEWART,
C. E. MULREANY.